US009325705B2

(12) United States Patent
Carpenter et al.

(10) Patent No.: US 9,325,705 B2
(45) Date of Patent: *Apr. 26, 2016

(54) TRUSTED INTERNET IDENTITY

(71) Applicant: Microsoft Technology Licensing, LLC, Redmond, WA (US)

(72) Inventors: Todd L. Carpenter, Happy Valley, OR (US); David Steeves, Seattle, WA (US); David Abzarian, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,703

(22) Filed: Oct. 27, 2014

(65) Prior Publication Data

US 2015/0106908 A1    Apr. 16, 2015

Related U.S. Application Data

(60) Continuation of application No. 13/682,346, filed on Nov. 20, 2012, now Pat. No. 8,898,755, which is a division of application No. 11/971,215, filed on Jan. 9, 2008, now Pat. No. 8,353,015.

(51) Int. Cl.
| G06F 21/60 | (2013.01) |
| H04L 29/06 | (2006.01) |
| G06F 21/62 | (2013.01) |

(52) U.S. Cl.
CPC ........ *H04L 63/0853* (2013.01); *G06F 21/6218* (2013.01); *H04L 63/08* (2013.01);
(Continued)

(58) Field of Classification Search
CPC ......... G06F 12/00; G06F 12/14; G06F 21/00;
G06F 21/41; G06F 21/6218; G06F 21/34;
H04L 9/32; H04L 63/168; H04L 63/0815;
H04L 63/0838; H04L 9/0877; H04L 9/3228;
H04L 9/3234
USPC .................. 726/2–7, 17–20, 26–27; 713/168,
713/183–185; 709/223, 225, 226, 229, 203,
709/214, 217, 219
See application file for complete search history.

(56) References Cited

U.S. PATENT DOCUMENTS

| 5,875,296 A * | 2/1999 | Shi et al. ............................ 726/5 |
| 6,081,893 A | 6/2000 | Grawrock et al. |

(Continued)

FOREIGN PATENT DOCUMENTS

| EP | 1909466 A1 | 4/2008 |
| WO | WO2004044756 A1 | 5/2004 |

OTHER PUBLICATIONS

Kallahalla, M. et al.; "Plutus: Scalable Secure File Sharing on Untrusted Storage", Mar. 31, 2003; 27 pages.

(Continued)

*Primary Examiner* — Thanhnga B Truong
(74) *Attorney, Agent, or Firm* — Sandy Swain; Micky Minhas

(57) ABSTRACT

A token or other storage device uses Internet identities to set file access attribute rights. Subsequently, requests to access a file can be controlled by confirming the Internet identity of the requestor by either validating the request with a known public key or retrieving the public key from an Internet identity provider. Files may be stored encrypted and may be re-encrypted with the public key associated with Internet identity making the request.

20 Claims, 4 Drawing Sheets

(52) U.S. Cl.
CPC . *G06F2221/2107* (2013.01); *G06F 2221/2111* (2013.01); *G06F 2221/2129* (2013.01); *G06F 2221/2141* (2013.01); *H04L 63/0442* (2013.01); *H04L 63/101* (2013.01)

(56) References Cited

U.S. PATENT DOCUMENTS

| | | | |
|---|---|---|---|
| 6,148,342 | A | 11/2000 | Ho |
| 6,581,161 | B1 | 6/2003 | Byford |
| 6,741,705 | B1 | 5/2004 | Nelson et al. |
| 7,020,645 | B2 | 3/2006 | Bisbee et al. |
| 7,739,379 | B1 | 6/2010 | Vahalia et al. |
| 8,353,015 | B2 | 1/2013 | Carpenter et al. |
| 8,365,244 | B2 * | 1/2013 | Beyer et al. ............. 726/2 |
| 8,787,555 | B2 * | 7/2014 | Gonen et al. ............. 379/265.11 |
| 8,898,755 | B2 | 11/2014 | Carpenter et al. |
| 2002/0170960 | A1 | 11/2002 | Ehrensvard et al. |
| 2003/0172090 | A1 | 9/2003 | Asunmaa et al. |
| 2005/0044197 | A1 | 2/2005 | Lai |
| 2005/0060580 | A1 | 3/2005 | Chebolu et al. |
| 2005/0149759 | A1 | 7/2005 | Vishwanath et al. |
| 2005/0197859 | A1 | 9/2005 | Wilson et al. |
| 2006/0031680 | A1 | 2/2006 | Maiman |
| 2006/0126848 | A1 | 6/2006 | Park et al. |
| 2007/0035390 | A1 | 2/2007 | Thomas et al. |
| 2007/0101152 | A1 * | 5/2007 | Mercredi et al. ............. 713/185 |
| 2007/0157298 | A1 | 7/2007 | Dingwall et al. |
| 2008/0222417 | A1 * | 9/2008 | Downes et al. ............. 713/172 |
| 2013/0081116 | A1 | 3/2013 | Carpenter et al. |

OTHER PUBLICATIONS

Montalbano, E.; "Microsoft Adds Mobile, Single Sign-On to Live ID"; infoworld; Oct. 23 2007; 3 pages.

Zaffar et al.; "Paranoid: A Global Secure File Access Control System"; Proceedings of the 21st Annual Computer Security Applications Conference; 2005; 5 pages.

Prosecution History from U.S. Appl. No. 11/971,215 including: Issue Notification mailed Dec. 18, 2012; Response to Amendment dated Nov. 2, 2012, Amendment After Notice of Allowance dated Oct. 17, 2012, Notice of Allowance dated Sep. 5, 2012, Amendment dated Jul. 2, 2012, Office Action dated Mar. 14, 2012, Amendment with RCE dated Dec. 9, 2011, Part 1 of 2.

Prosecution History from U.S. Appl. No. 11/971,215 including: Final Office Action dated Nov. 8, 2011, Amendment dated Aug. 31, 2011, Office Action dated Jul. 11, 2011, Election of Species dated Apr. 18, 2011, Office Action dated Mar. 24, 2011, and Application filed Jan. 9. 2008, Part 2 of 2, 107 pages.

Prosecution History from U.S. Appl. No. 13/682,346 including: Issue Notification dated Nov. 5, 2014, Notice of Allowance mailed Jul. 21, 2014, Amendment dated May 9, 2014, Office Action dated Dec. 9, 2013, Response to Election/Restriction dated Sep. 27, 2013, Requirement for Restriction/Election dated Aug. 28, 2013, Preliminary Amendment dated Nov. 20, 2012, and Application filed Nov. 20, 2012, 62 pages.

* cited by examiner

TRUSTED INTERNET IDENTITY

CROSS-REFERENCE TO RELATED APPLICATIONS

The present application is a continuation of, and claims priority to, U.S. patent application No. 13/682,346, filed on Nov. 20, 2012, which is a divisional of, and claims priority to, U.S. patent application Ser. No. 11/971,215, filed on Jan. 9, 2008. The content of these applications is hereby incorporated by reference in its entirety.

BACKGROUND

Access control has been used for decades to create a list of users that can access a file or service, and to what extent a user can interact with that file or service. Some users may be granted read-only access to a file, while others have read and edit rights. Still other users may have the ability to read, edit, and delete a file.

Access control lists are maintained by an operating system. In some cases, transferring a file from one computer to another may transfer the access control list associated with a file, but if the receiving computer does not have corresponding accounts, or does not enforce access control, the file may either be permanently locked and inaccessible, or unlocked and fully available to any account holder.

When a file is transferred to another type of computer system, for example, from a PC to a UNIX machine, the access control list may be meaningless.

The widespread use of portable media, from early one megabyte floppy disks to multiple gigabyte USB drives, has exacerbated this problem. Entire data sets may be moved quickly and easily, but the controls associated with access to those data sets can become both troublesome and irritating on one hand, and ineffective on the other.

SUMMARY

A portable storage device enforces access control, not based on the operating system and local accounts of a host computer, but rather uses Internet-based identities for uniform enforcement of access privileges. The processor-type and operating system of a host computer does not affect access control because the portable storage device, or storage token, depends on a trusted service to provide identity confirmation.

When a requesting entity seeks access to protected data, the request may incorporate a trusted identity, such as an authenticated cookie, that is evaluated locally at the storage token for use in determining whether access should be granted.

The trusted identity may be established when the requesting entity logs in to a trusted site, provides its credentials and is then provided with a time-limited voucher, such as the authenticated cookie. The authenticated cookie can then be used during its duration for access.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
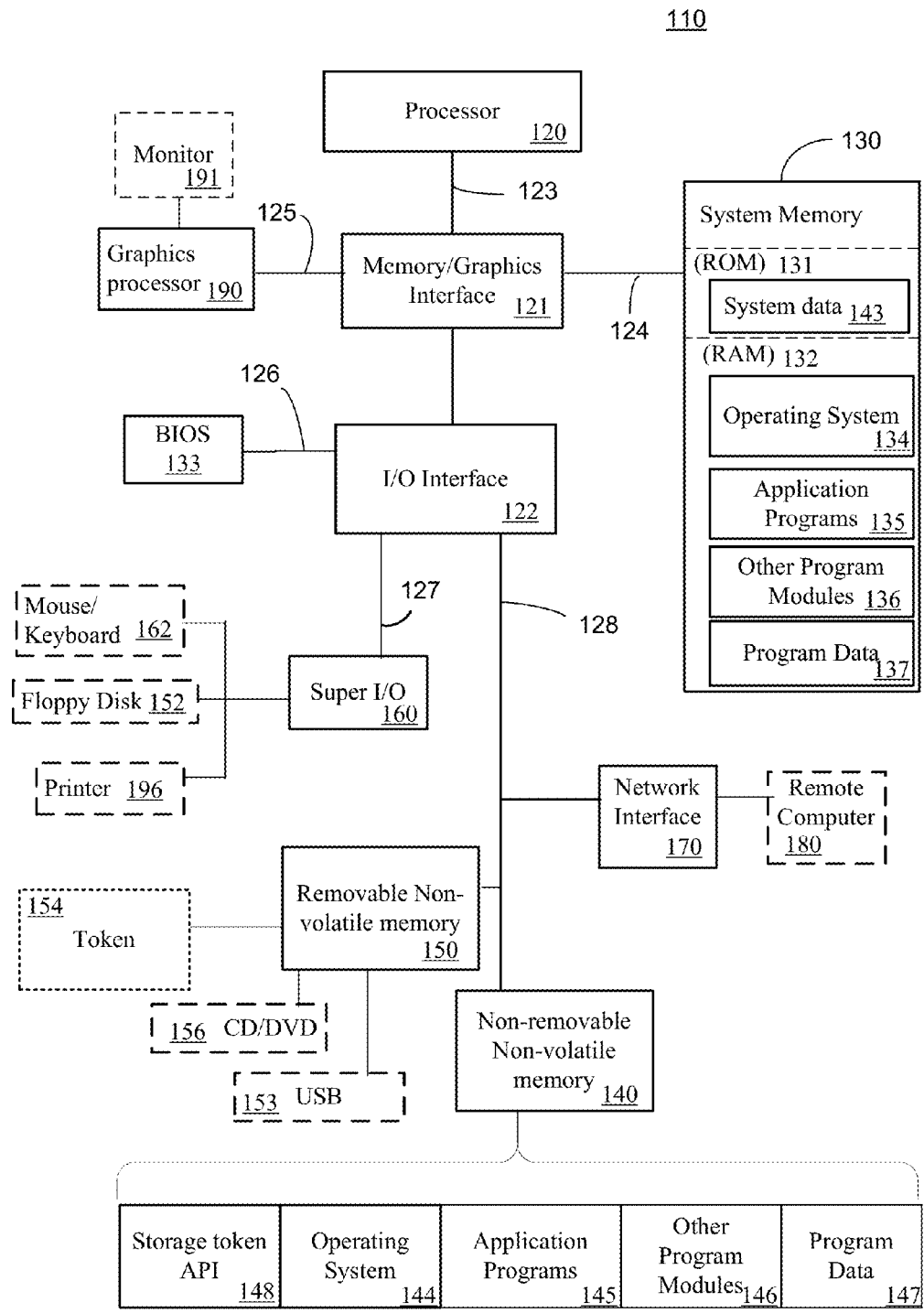
FIG. 1 is a block diagram of a computer and associated elements illustrating a platform supporting trusted Internet identities.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 153 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

A storage token 154 may be removably attached to the computer 110. The storage token 154 may be a smart card or other device capable of cryptographic one-way or mutual authentication between itself and one or more processes on the computer 110 or remote computer 180. A token API 148 may be available for application programs 145 or for a remote computer 180 connected via network 170 to access the storage token 154. The storage token may have a user interface (not depicted) for display of information and input of data. The use of the storage token 154 is discussed in more detail below.

Note that an Internet identity may not be restricted to Internet accessible providers. For example, a corporation could use Internet identities in the sense of this description, even though a company Intranet or local area network server could host the identity management function.

Figure 2:
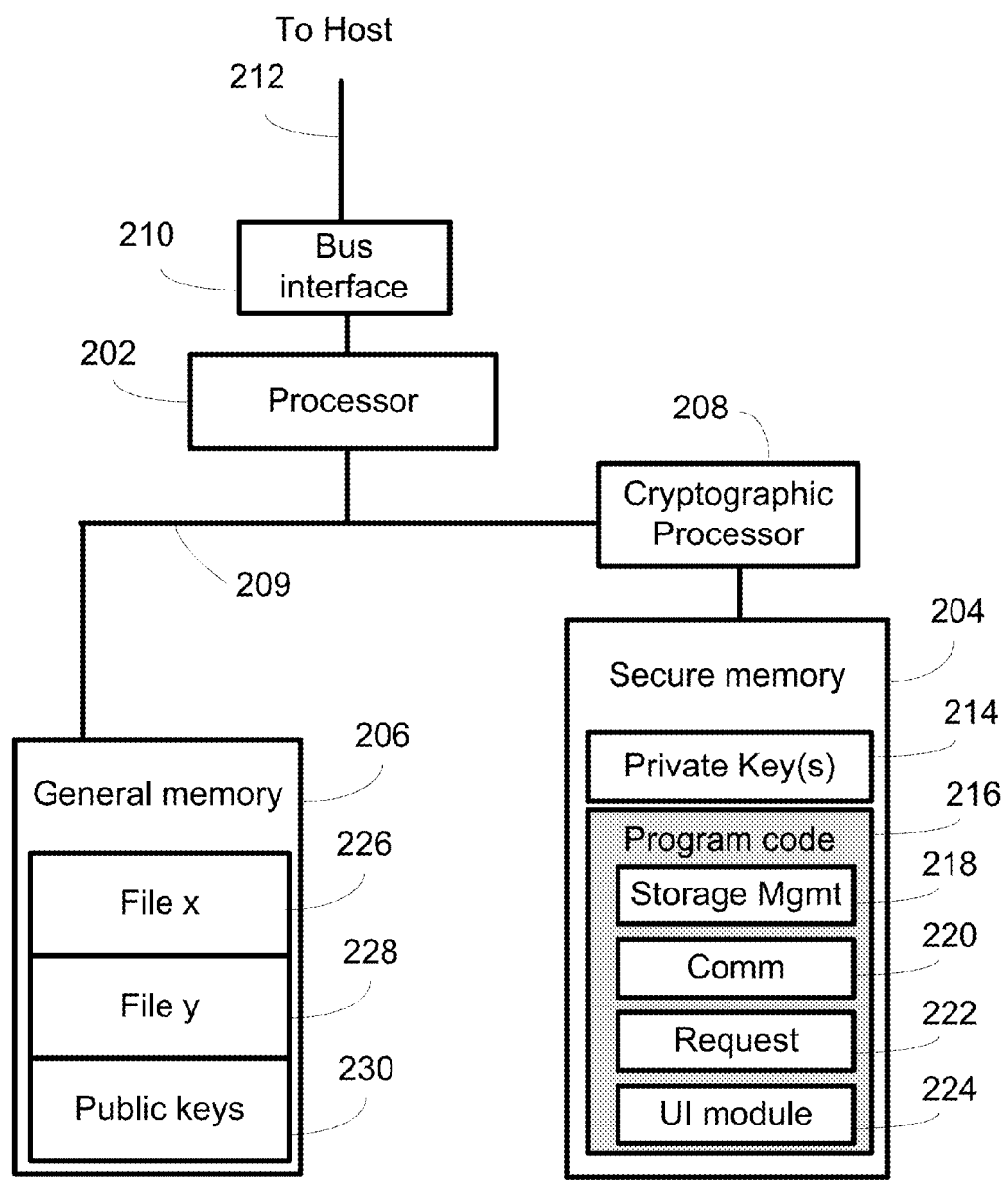
FIG. 2 is a block diagram of a storage token supporting trusted Internet identities.

FIG. 2 is a block diagram illustrating a token 200 used to support trusted Internet identities. The token 200 may include a processor 202, a general memory 206, a cryptographic processor 208, and a first bus 209 connecting these components. A secure memory 204 may be accessed via the cryptographic processor 208 and may include storage locations for keys 214 and program code 216. The program code may include modules for storage management 218, communication 220, request management 222, and user interface 224. The cryptographic processor 208 may be used to accelerate cryptographic processes such as encryption and signing.

The general memory 206 may include memory locations generally available to users and may be used to store a plurality of files, such as file x 226, and file y 228. These files may be data, programs, media, etc. The general memory 206 may also include publicly available, non-secure operations-oriented data, such as public keys 230.

A bus interface 210 may connect to a second bus 212. The second bus 212 may allow removable coupling to a host, such as a computer 110, shown in FIG. 1. While the host may be a computer, the host may also be a cellular telephone, smart phone, personal digital assistant, media player, a networked terminal device, a server, etc. The second bus 212 may be a USB interface, a 1394/firewire interface, or any of several other existing or emerging data connections. In some embodiments, the token 200 may be removably attached to a host. However, in other embodiments, the token 200 may be embedded in a device, such as a portable device. In still other embodiments, the token 200 may be secured in a device, such as a computer or server, so that attempted removal may cause damage to the token 200, the host device, or both.

In operation, after coupling to a host, the processor 202 may access the user interface module 224 to present a user with options for storing and securing data, such as file x 226 or file y 228. To add protection to an existing file, a user may select an Internet identity from an address book containing identities. The address book may be associated with a mail program, an instant messaging program, etc. The Internet identity of the user may be in the form of an alias, such as a screen name, a mail address, or another name. Once a user has been identified, the file may be marked with metadata for access control. For example, file x 226 may be designated to allow read access to user A and user C. File y 228 may be designated to allow read access to user A and user B. Unlike conventional access control, the identification of users A, B, and C may not be tied to an operating system or local network login identity. The user identity may be associated with the user's Internet identity, as assigned by a third party over which local account managers/network managers have no control.

When access to a file is requested, the access rights may be checked and the request's validity may be verified using a known public key or by analyzing an associated request packet. The request packet may include an Internet identity in the form of a self-signed certificate or a time-limited cookie containing the Internet identity, a public key for the Internet identity, and information identifying the requested file. The identifying information may be or include a file name, file id (such as a hash of some or all of the contents), metadata (e.g. author, date saved, title), etc.

If the Internet identity is verified, and that identity is designed as having rights to the requested file, the access may be granted. Access may include the ability to read the file, write/update the file, or delete the file. Additional rights may allow the request to change the access rights to the file. In other words, the token 200 may enforce controls using Internet identities similar in content and scope to those used to control a conventional, local file system, for example, in a UNIX environment.

Figure 3:
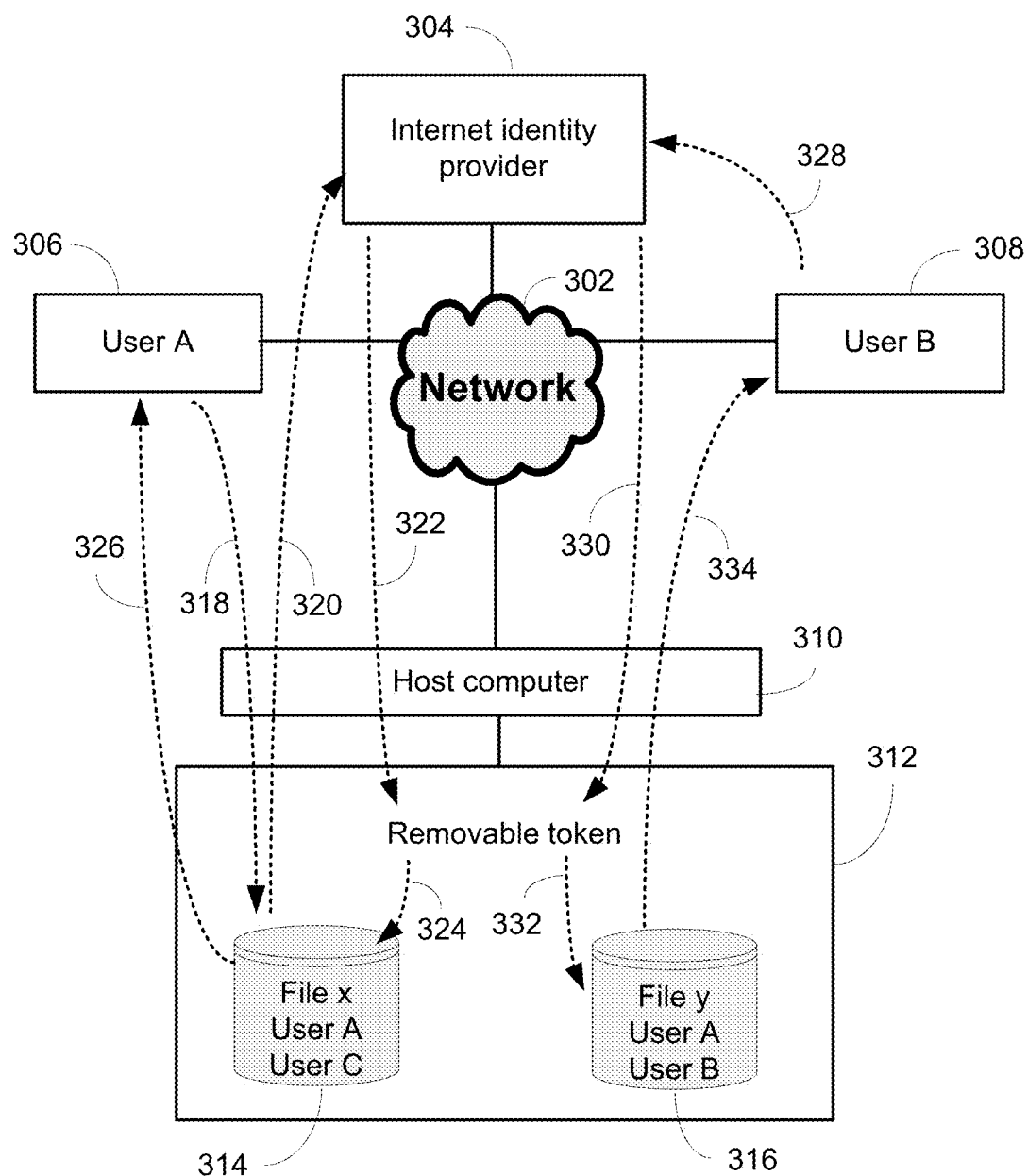
FIG. 3 is a topology of a system supporting trusted Internet identities.

FIG. 3 illustrates a topology 300 and sample data flows corresponding to the use of Internet identities for access control. A network 302 connects various elements of the topology 300. The network 302 may be the Internet. The network 302 may also be an enterprise network, a corporate intranet, etc. The network may support data communication with an Internet identity provider 304. The term Internet is used here generically and for ease of illustration. The Internet identity provider 304 may, in practice, not have connectivity to the world-wide network known collectively as the Internet. The network may support a user A 306 and a user B 308. The users 306, 308 may be computers, smart phones, handheld appliances, etc.

A host computer 310 may also be coupled to the network 302 and be accessible to the identity provider 304 and users 306, 308. A token 312, similar to the token 200 of FIG. 2, may have files x 314 and y 316. The file x 314 may have access rights designated to user A 306 and user C (not depicted). The file y 316 may have access rights designated to user A 306 and user B 308.

User A 306 may send a request 318 to the token 312 requesting access to file x 314. The token 312 may send a confirmation request 320 to the Internet identity provider 304. The Internet identity provider 304 may prepare a confirmation of identity using criteria provided in the original request 318. For example, a global cookie sent in the original request 318 may include encrypted authentication information that is forwarded to the Internet identity provider 304.

The Internet identity provider 304 may verify the encrypted authentication information and send a reply 322 to the token 312. The reply 322 may include a local cookie with an expiration date and a signed confirmation of identity. If the signed confirmation is verified by the token and the identity matches that of the requestor (i.e. user A 306), instructions 324 may be executed that make file x 314 available 326 to the requestor.

To improve security, several measures may be taken. For example, files may be encrypted with a local key while stored. Therefore, the making the file available to the requestor may involve decrypting the file locally before making the file available. In other embodiments, instead of or in addition to local encryption, files may be encrypted with the requestor's public key when being made available. In this way, only the requestor can decrypt the file using its corresponding private key.

Illustrating an alternate flow, user B 308 issues a request 328 to the Internet identity provider 304. The request 328 may include a login identification and password sequence so the Internet identity provider 304 can verify the identity of user B 308. Using file identification information in the request 328, the Internet identity provider 304 may directly send a request 330 to the token 312. The request 330 may be sent via an instant message network, text messaging service, email, etc., and may also include verification data along with file identification information.

After the token 312 confirms the verification data and also confirms that the requesting party has rights to the requested file, instructions 332 may be issued to make the file available 334 to user B 308.

Figure 4:
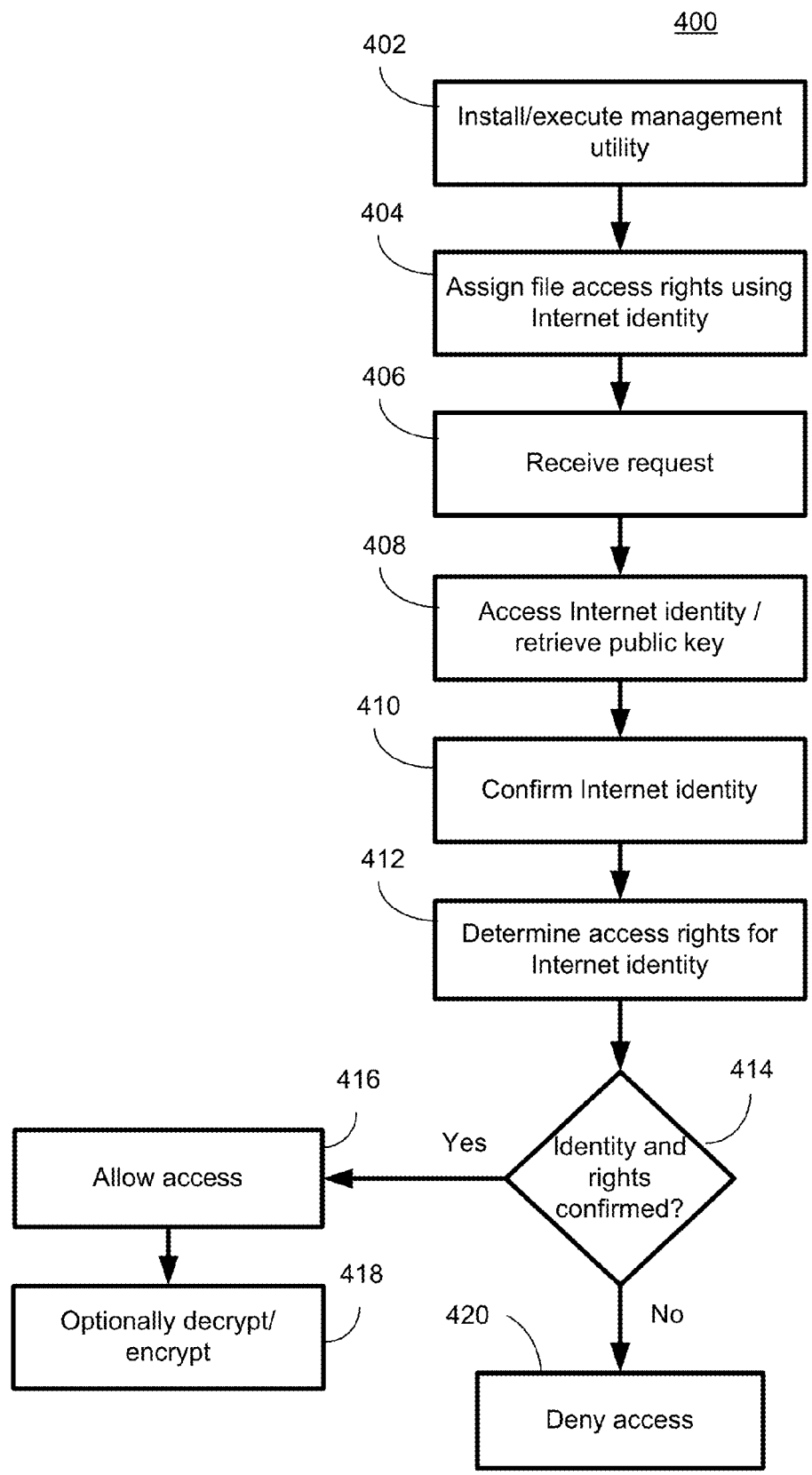
FIG. 4 is a method of performing file access control using a trusted Internet identity.

FIG. 4 is a method 400 of securing data using an Internet identity. At block 402, a management utility, such as user interface 224 of FIG. 2, may be installed and executed on a host computer, such as computer 110 of FIG. 1. The management utility 224 may support assignment of file access rights to a file, such as file x 314. The file 314 may include simple data, but may also be an executable program, media, security information, etc. In one embodiment, the management utility 224 may reside on a file system (for example, secure memory 204) that also contains the file 314 receiving the rights assignments, even though the management utility 224 may be executed on the host computer 110.

At block 404, file access rights may be assigned to the file 314 for an Internet identity, for example, Internet entity user A 306. The privileges associated with making the access rights assignment may involve first establishing those privileges by asserting a second Internet identity, e.g. user B 308. Both the first and second Internet identities 306 308 may be identities that are independent of an operating system identity associated with the host computer 110. That is, status or existence of a local account on the host computer 110 may not be considered when determining whether to allow assignment of access rights to the file 314. Optionally, the file 314 may be encrypted with a local key while stored.

At block 406, a request to access the file 314 may be received. The request may include an Internet identity of a requestor (e.g. user A 306) and file identification information. Alternatively, the request may include a cookie or other authenticated packet including the Internet identity, a public key, and a cookie expiration date.

At block 408, after receiving the request, a token 200, or other request processor, may access an Internet identity provider 304 over a network connection 302. The Internet identity provider 304 may allow retrieval of a public key associated with the Internet identity of the requestor.

At block 410, the token 200 may confirm the Internet identity using the public key to authenticate data in the request. That is, the token 200 may use the public key associated with the Internet identity to decrypt or verify the signature of a portion of the request signed with the private key associated with the Internet identity.

At block 412, the token 200 may determine if the requesting Internet identity has access rights to the file identified in the request, e.g. file 314.

At block 414, the token 200 may the confirm that requestor has established its Internet identity and has access rights to the file 314. If so, the 'yes' branch may be taken to block 416 and access may be allowed. If the file 314 was encrypted for storage at block 404, the file 314 may be decrypted. At block 418, if required by the access rights for the file 314 or by policy, the file 314 may be encrypted with the private key of associated with the Internet identity 306. This will help ensure privacy of the file 314.

If, at block 414, either the Internet identity of the requestor cannot be confirmed, or the requestor does not have rights to the file 314, the 'no' branch may be followed to block 420 and access to the file 314 may be denied. It may be a matter of policy whether to respond to a requestor whose request is denied, and if allowed, what error message may be returned.

The use of an Internet identity to set and confirm file access rights allows uniform file access policies to be established across different operating systems and networks. Because file access is not a function of local policy or rules. Even files on a portable token can be uniformly protected since encrypted contents can only be accessed by predetermined Internet identities. This remains true even if the token is lost or stolen.

The use of cookies with Internet identity information and expiration information allows access to confirmed entities even if network connections are limited or not available.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A token device supporting file access control or a user of a host computing device, the token device comprising:
   a processor;
   an interface configured to communicatively couple the token device to the host computing device;
   a memory configured to store one or more private keys; and
   one or more modules configured to support file access control for the user by establishing cryptographic authentication with a remote computing system, that is remote to the host computing device, using the processor, the one or more modules being configured to:
   receive an authentication request from the remote computing system in response to a file access request, the authentication request including information indicative of a requested file and verification data associated with the requested file; and
   generate authentication information, based on the verification data, using a private key stored in the memory that is associated with the requested file, wherein the authentication information is transmitted to the remote computing system to provide user access to the requested file.

2. The token device of claim 1, wherein the interface is configured to facilitate a local communicative coupling of the token device to the host computing device.

3. The token device of claim 2, wherein the interface comprises a USB interface.

4. The token device of claim 1, wherein the remote computing system comprises an Internet identity provider.

5. The token device of claim 4, wherein the Internet identity provider comprises a web service.

6. The token device of claim 1, wherein the file access request includes an Internet identity associated with the user.

7. The token device of claim 1, wherein the remote computing system includes a public key corresponding to the private key.

8. The token device of claim 1, wherein the authentication information is encrypted using the private key.

9. The token device of claim 1, wherein the authentication information comprises a signed credential.

10. The token device of claim 1, wherein the processor comprises a cryptographic processor for performing cryptographic operations.

11. The token device of claim 1, wherein the one or more modules comprise:
a communication module configured to send the file access request to the remote computing system.

12. A method of controlling user data access at a user computing device, the method comprising:
receiving, at the user computing device, a data access request from a user;
sending a confirmation request that includes a credential from the user computing device to an Internet identity provider over a network, the credential including an Internet identity associated with the user;
receiving at the user computing device from the Internet identity provider, in response to the confirmation request, a time-limited voucher; and
providing user data access at the user computing device based on the time-limited voucher.

13. The method of claim 12, wherein the voucher comprises an authenticated cookie.

14. The method of claim 12, wherein providing user data access comprises:
providing the user with access to a file, stored local to the user computing device, during a period of time defined by the time-limited voucher.

15. The method of claim 14, wherein the user is provided with access to the file during the period of time even if a network connection to the Internet identity provider is limited or not available.

16. The method of claim 12, wherein the confirmation request is generated by a token device that is communicatively coupled to the user computing device.

17. The method of claim 16, wherein the token device is configured to provide user data access to a file using a public key stored on the token device.

18. A method of controlling data access using an Internet identity, the method comprising:
receiving a data access request from a user computing device over a network, the data access request requesting user access to a portion of data and including an Internet identity associated with a user;
generating a verification request that includes verification data based on the data access request;
sending the verification request to the user computing device;
receiving authentication information from the user computing device;
verifying the data access request based on the authentication information; and
providing the requested user access to the portion of data based on the verification.

19. The method of claim 18, wherein verifying the data access request comprises:
retrieving a public key associated with the Internet identity; and
verifying the data access request using the public key.

20. The method of claim 19, wherein the data access request and authentication information are received at an Internet identity provider that is remote from the user computing device.

* * * * *